United States Patent
Ashikaga

(10) Patent No.: US 7,889,929 B2
(45) Date of Patent: Feb. 15, 2011

(54) IMAGE PROCESSING APPARATUS, IMAGE PROCESSING METHOD, COMPUTER READABLE MEDIUM STORING PROGRAM AND DATA SIGNAL EMBEDDED WITH THE PROGRAM

(75) Inventor: Hideaki Ashikaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1020 days.

(21) Appl. No.: 11/712,492

(22) Filed: Mar. 1, 2007

(65) Prior Publication Data
US 2007/0206881 A1   Sep. 6, 2007

(30) Foreign Application Priority Data

Mar. 3, 2006   (JP)   ............................. 2006-057159
Dec. 25, 2006   (JP)   ............................. 2006-346980

(51) Int. Cl.
G06K 9/46   (2006.01)
G06K 9/32   (2006.01)

(52) U.S. Cl. ........................ 382/195; 382/291; 382/294; 382/295

(58) Field of Classification Search ................. 382/291, 382/294, 295, 195, 151, 154
See application file for complete search history.

(56) References Cited

U.S. PATENT DOCUMENTS 5,857,034 A * 1/1999 Tsuchiya et al. ............ 382/175
5,920,658 A   7/1999 Yamagata et al.
6,038,349 A * 3/2000 Cullen ........................ 382/294
6,549,681 B1   4/2003 Takiguchi et al.
7,194,144 B1 * 3/2007 Sakai et al. .................. 382/284
2006/0115180 A1 * 6/2006 Adams et al. ............... 382/284
2008/0123996 A1 * 5/2008 Zavadsky et al. ............ 382/294

FOREIGN PATENT DOCUMENTS

JP   A 09-093431   4/1997
JP   A 09-245173   9/1997

* cited by examiner

Primary Examiner—Jon Chang
(74) Attorney, Agent, or Firm—Oliff & Berridge, PLC

(57) ABSTRACT

An image processing apparatus includes a feature region extracting section, a feature amount calculating section, a position calculating section, first and second selecting sections and a correction factor calculating section. The feature region extracting section extracts feature regions. The feature amount calculating section calculates feature amounts of the extracted feature regions. The position calculating section calculates positions of the extracted feature regions. The first selecting section selects pairs of feature regions, which are estimated to be common in the first and second images, based on the feature amounts and the positions. The second selecting section narrows down the selected pairs of feature regions based on similarity in relative positional relation between the feature regions of the first and second images. The correction factor calculating section calculates a correction factor used to correct position shift between the first and second images based on the narrowed pairs of feature regions.

7 Claims, 12 Drawing Sheets

FIG. 6

Image a

| FEATURE REGION ID | DENSITY CENTROID (x, y) | FEATURE AMOUNT INFORMATION ||||||
|---|---|---|---|---|---|---|---|
| | | CIRCUMSCRIBED RECTANGLE WIDTH (L) | CIRCUMSCRIBED RECTANGLE HEIGHT (H) | CIRCUMSCRIBED RECTANGLE ASPECT RATIO (H/L) | LINE LENGTH (n) | LINE AREA (Nall) | LINE WIDTH (W) |
| a0001 | (45, 55) | 25 | 30 | 25/30 | 420 | 3420 | 4 |
| a0002 | .. | .. | .. | .. | .. | .. | .. |
| .... | .... | .... | .... | .... | .... | .... | .... |
| a0nnn | .. | .. | .. | .. | .. | .. | .. |

Image b

| FEATURE REGION ID | DENSITY CENTROID (x, y) | FEATURE AMOUNT INFORMATION ||||||
|---|---|---|---|---|---|---|---|
| | | CIRCUMSCRIBED RECTANGLE WIDTH (L) | CIRCUMSCRIBED RECTANGLE HEIGHT (H) | CIRCUMSCRIBED RECTANGLE ASPECT RATIO (H/L) | LINE LENGTH (n) | LINE AREA (Nall) | LINE WIDTH (W) |
| b0001 | (44, 56) | 24 | 31 | 24/31 | 425 | 3472 | 5 |
| b0002 | .. | .. | .. | .. | .. | .. | .. |
| .... | .... | .... | .... | .... | .... | .... | .... |
| b0nnn | .. | .. | .. | .. | .. | .. | .. |

FIG. 14

| | SEARCH RANGE OF PAIRS OF FEATURE REGIONS | NUMBER OF TYPES OF FEATURE AMOUNT INFORMATION TO BE COMPARED | CONCORDANCE DEGREE OF FEATURE REGION INFORMATION TO BE COMPARED |
|---|---|---|---|
| FIRST TIME | WIDE | ARBITRARY | STRICT |
| SECOND TIME | ⇩ | ⇩ | ⇩ |
| : | | | |
| nTH TIME (FINAL) | NARROW | ARBITRARY | RELAXED |

ROUGH ADJUSTMENT ⇒ FINE ADJUSTMENT

FIG. 15

| NUMBER OF PROCESSES (J) | SEARCH RANGE OF PAIRS OF FEATURE REGIONS | CONCORDANCE OF FEATURE AMOUNT INFORMATION TO BE COMPARED | NUMBER OF PAIRS OF ASSOCIATED FEATURE REGIONS |
|---|---|---|---|
| J=1 | CENTROID POSITION ±20mm | FEATURE AMOUNT ERROR ±1% | 10 to 20 |
| J=2 | CENTROID POSITION ±2mm | FEATURE AMOUNT ERROR ±10% | 100 to 200 |
| J=3 | CENTROID POSITION ±0.4mm | FEATURE AMOUNT ERROR ±20% | 200 to 300 |

IMAGE PROCESSING APPARATUS, IMAGE PROCESSING METHOD, COMPUTER READABLE MEDIUM STORING PROGRAM AND DATA SIGNAL EMBEDDED WITH THE PROGRAM

CROSS-REFERENCE TO RELATED APPLICATIONS

This application is based on and claims priority under 35 U.S.C. §119 from Japanese Patent Application No. 2006-57159 filed Mar. 3, 2006 and Japanese Patent Application No. 2006-346980 filed Dec. 25, 2006.

BACKGROUND

1. Technical Field

This invention relates to an image processing apparatus, an image processing method, a computer readable medium storing an image processing program and a data signal embedded with the program, particularly to an image processing apparatus, a computer readable medium storing an image processing program and a data signal embedded with the program for calculating a position shift amount between two pieces of image data and performing a correction process for position alignment.

2. Related Art

In the field of image processing, there are many cases where position alignment between images on two paper documents of identical type is demanded. For instance, in the case of extracting information filled in (added) by a user on a paper document, such as a legal sheet and a resume, output by a printer or a fax (facsimile apparatus) from the paper document or in the case of examining as to whether or not a security document has been falsified, a process of detecting the added information or the falsified part by comparing scan image data obtained by scanning the paper document with original image data of an electronic original is performed. In this detection process, it is necessary to perform position alignment between the scan image and the electronic original image with high accuracy before making comparison between the scan image data and the original image data.

SUMMARY

According to an aspect of the invention, an image processing apparatus includes a feature region extracting section, a feature amount calculating section, a position calculating section, a first selecting section, a second selecting section and a correction factor calculating section. The feature region extracting section extracts plural feature regions from each of first and second images. The feature amount calculating section calculates feature amounts of the feature regions extracted by the feature region extracting section. The position calculating section calculates positions of the feature regions extracted by the feature region extracting section. The first selecting section selects pairs of feature regions, which are estimated to be common in the first and second images, based on the feature amounts calculated by the feature amount calculating section and the positions of the feature regions calculated by the position calculating section. The second selecting section narrows down the selected pairs of feature regions based on similarity in relative positional relation between the feature regions of the first and second images. The correction factor calculating section calculates a correction factor used to correct position shift between the first and second images based on the narrowed pairs of feature regions by the second selecting section.

BRIEF DESCRIPTION OF THE DRAWINGS

Exemplary embodiments of the invention will be described in detail below with reference to the accompanying drawings wherein:

FIG. 6 is an explanatory view of feature region tables;

FIG. 14 is an explanatory view of a similarity selection criteria for use in a process of selecting the pair of feature regions;

FIG. 15 is an explanatory view of an example of processing the similarity selection criteria according to another control example.

DETAILED DESCRIPTION

Hereinafter, exemplary embodiments of the invention will be described in detail with reference to the drawings.

Figure 1:
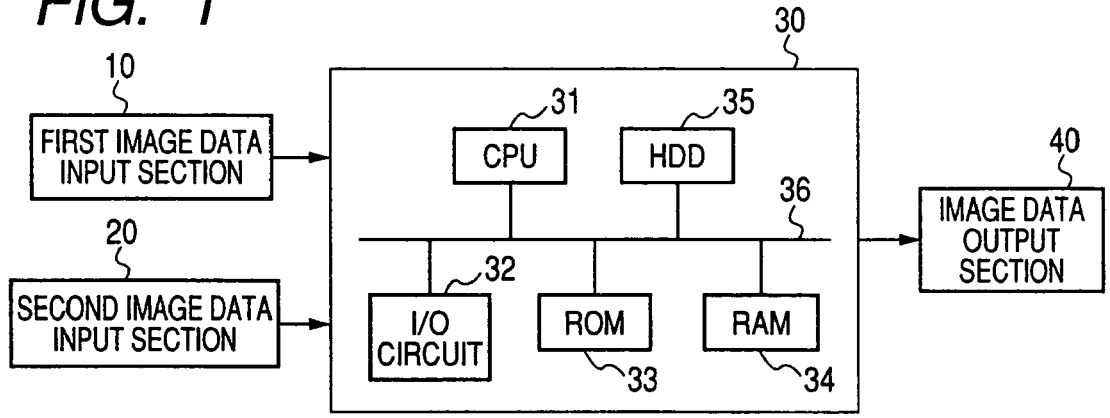
FIG. 1 is a block diagram schematically showing the configuration of an image information processing system according to an exemplary embodiment of the invention.

FIG. 1 is a block diagram showing the configuration of an image information processing system according to an exemplary embodiment of the invention. As shown in FIG. 1, the image information processing system according to this exemplary embodiment has a first image data input section 10, a second image data input section 20, a process control section 30 and an image data output section 40. For example, the image information processing system performs image processing for extracting added information, which a user has filled in (added to) a paper document such, as a legal document and a resume, output by a printer or a facsimile apparatus.

Before comparing image data of a scan image, which is a comparison object and is acquired by scanning a paper document, with image data of an original image, which is a comparison criteria, the image information processing system for extracting added information according to the exemplary embodiment detects a position shift amount of the scan image on the image with respect to the original image and stably executes image processing for position alignment (position correction) between the scan image and the original image at high speed with high accuracy, based on the position shift amount.

It is noted that the invention is not limited to the extracting of the added information. The invention may be applied to general image processing for position alignment (position correction) between two images in the case of aligning a position of a scan image and a position of an original image so as to detect a falsified part by comparing between the scan image and the original image in examining as to whether or not a security document is falsified, for example.

Also, the combination of the image of the comparison criteria and the image of the comparison object is not limited to the combination of the original image and the scan image. Various combinations such as a combination of a scan image and a scan image may be used.

Hereinafter, the case where the combination of the original image and the scan image is used in the image information processing system for extracting the added information from the paper document will be described by way of example.

Referring to FIG. 1, the first image data input section 10 is a server including a storage device of a personal computer, and inputs original image data of an electronic original to the process control section 30 as image data of a comparison criteria. The second image data input section 20 includes an image reading device such as a scanner and a controller for the image reading device, and inputs scan image data obtained by scanning a paper document to the process control section 30 as image data of a comparison object.

The process control section 30 has a CPU (central Processing Unit) 31, an I/O circuit 32, a ROM 33, a RAM 34 and an HDD (Hard Disk Drive) 35. These components are mutually connected via a bus line 36 so as to be able communicate with each other.

The CPU 31 controls processing performed by the entire process control section 30 including arithmetic processing. The I/O circuit 32 manages input and output to/from peripheral devices including the first and the second image data input sections 10 and 20 and the image data output section 40. The ROM 33 stores processing programs for various processings executed under the control of the CPU 31. The RAM 34 is a primary storage device used when the various processings are executed. The HDD 35 stores image data processed under the control of the CPU 31 and image data acquired from external devices.

The image data output section 40 includes an output device such as a printer or a display, and a controller for the output device. The image data output section 40 prints out or displays the added information extracted from the paper document by the process control section 30 on a sheet of printing (recording) paper or a display screen.

The original image data of the electronic original is input from the first image data input section 10, which is the server in this exemplary embodiment. Alternatively, a hard disk of the HDD 35 may store original image data in advance, and the processing control section 30 may use the original image data stored in the hard disk.

Also, the second image data input section 20 may also serve as the first image data input section 10, and image data obtained by scanning an original image by the second image data input section 20 may be input to the process control section 30 as the image data of comparison criteria.

In the image information processing system having the above-described configuration, the process control section 30 has various image processing functions for executing various image processings based on the original image data input from the first image data input section 10 and the scan image data input from the second image data input section 20.

Figure 2:
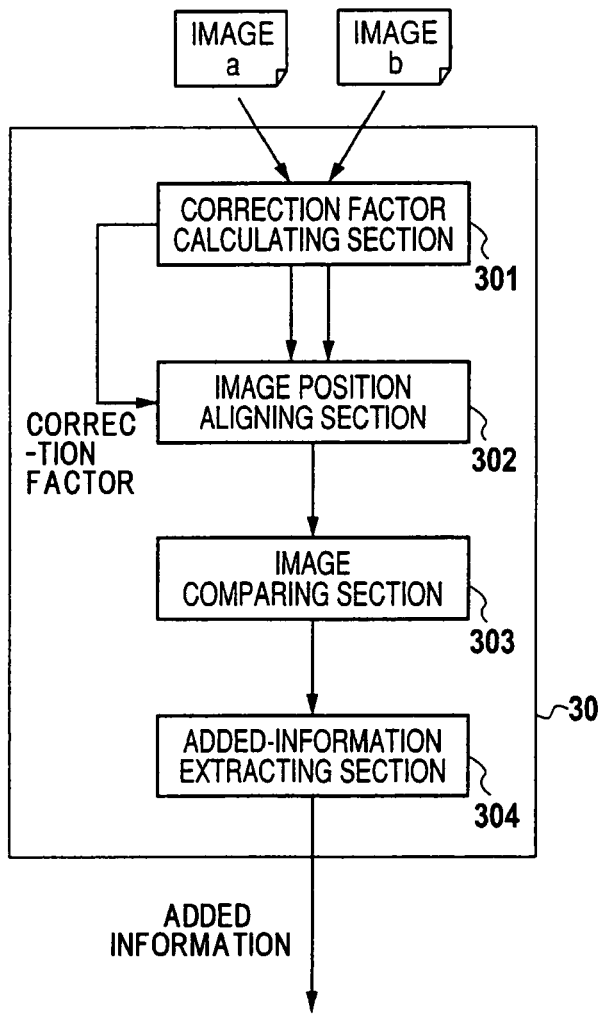
FIG. 2 is a block diagram showing an example of the functional configuration of a process control section in the image information processing system.

Specifically, as shown in FIG. 2, the process control section 30 has image processing functions of a correction factor calculation processing section 301, an image position aligning section 302, an image comparing section 303 and an added-information extracting section. The correction factor calculation processing section 301 obtains a position shift amount of the scan image with respect to the original image based on the image data of the original image and the image data of the scan image and calculates a correction factor (parameter) for position alignment based on the position shift amount. Here, the position shift amount may be the correction factor for position alignment). The image position aligning section 302 performs position alignment between the two images using the correction factor calculated by the correction factor calculation processing section 301. The image comparing section 303 compares the images (image data) after the position alignment by the image position aligning section 302. The added-information extracting section 304 extracts added information based on the comparison result by the image comparing section 303.

The correction factor calculation processing section 301 for obtaining the correction factor (parameter) for position alignment, which is one of the image processing functions of the process control section 30, may serve as an image processing apparatus. Also, a processing program for executing the function of the correction factor calculation processing section 301 may serve as an image processing program.

(Correction Factor Calculation Processing)

Hereinafter, the correction factor calculation processing section 301 and its processing program for obtaining a correction factor for position alignment will be described. The correction factor calculation processing section 301 according to this exemplary embodiment calculates a correction factor (parameter), which is used to perform relative position alignment (position correction) between an original image (hereinafter referred to as an "image 'a'") input from the first image data input section 10 and a scan image (hereinafter referred to as an "image 'b'") input from the second image data input section 20.

Specifically, the correction factor calculation processing section 301 extracts feature regions of the images from the two images 'a' and 'b'; calculates feature amounts of the feature regions; stores the calculated feature amounts as a feature region table; selects pairs of feature regions in each of which the feature regions are expected to be common in the two images 'a' and 'b' in terms of similarity in feature amount by referring to the feature region tables; narrows down the pairs of feature regions based on similarity in relative positional relation among the pairs of feature regions; calculates a position shift amount between the two images 'a' and 'b', that is, a correction factor for position alignment, from the narrowed pairs of feature regions; and outputs the calculated correction factor to the image position aligning section 302 at the next stage.

The image position aligning section 302 applies an image conversion to one of the images 'a' and 'b' or the image data of the one of the images 'a' and 'b' using the correction factor calculated by the correction factor calculation processing section 301 to perform the relative position alignment between the two images 'a' and 'b'. For example, as an image conversion method, the image position aligning section 302 may employ the affine transformation, which uses a widthwise displacement (X), a lengthwise displacement (Y), a rotation angle (θ) and a magnification factor (β) as the correction factors (parameters) for position alignment.

The correction factor calculation processing section 301 according to this exemplary embodiment determines the correction parameters (parameters) used in the image conversion (affine transformation) based on the position shift amount obtained from the ultimately narrowed pairs of feature regions of the two images 'a' and 'b'. Since the image position aligning section 302 performs the image conversion by employing the affine transformation, the correction factor calculation processing section 301 uses the detected position shift amount per se as alignment parameters (correction factors).

Figure 3:
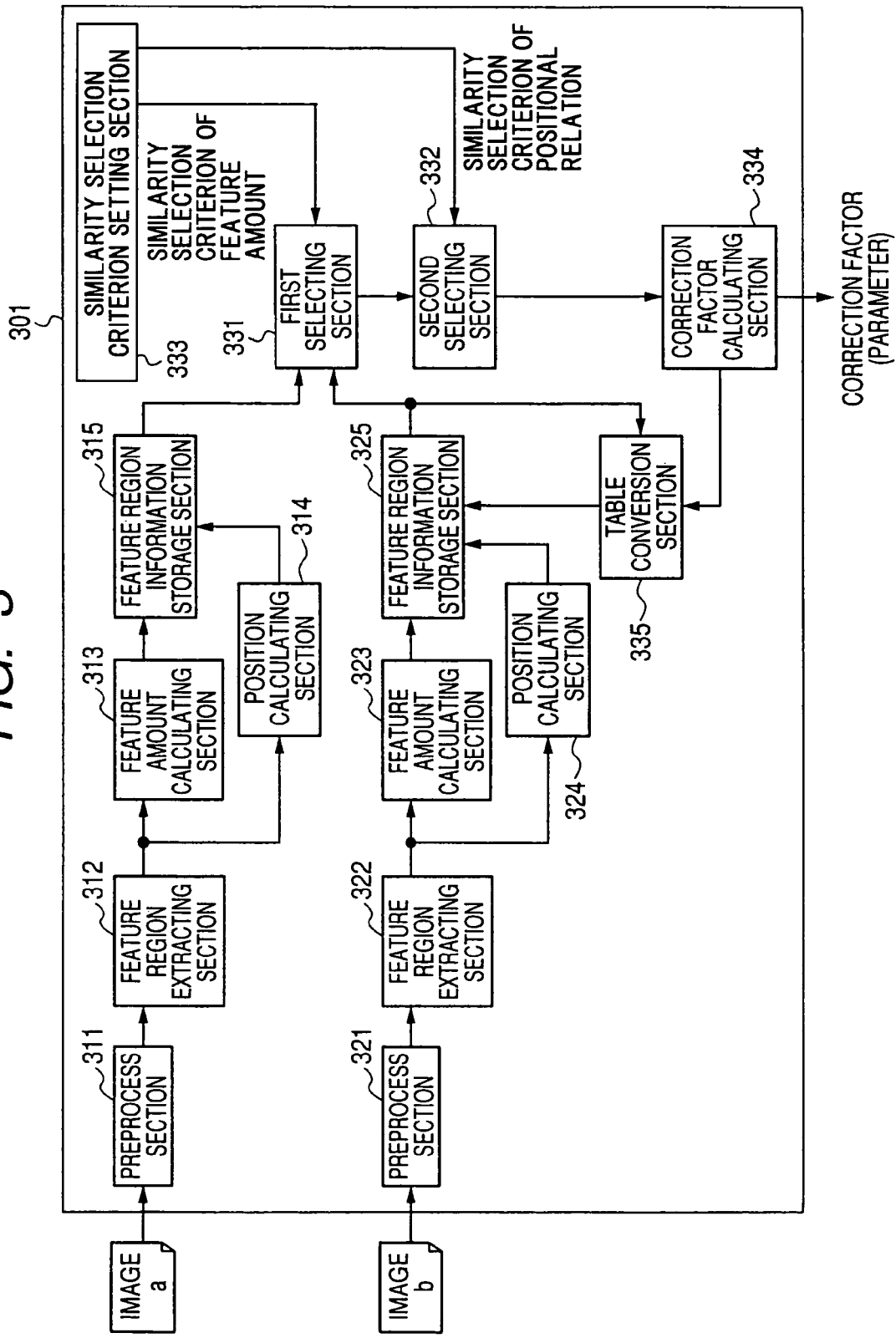
FIG. 3 is a block diagram showing an example of the functional configuration of a correction factor calculating section according to the exemplary embodiment of the invention.

FIG. 3 is a block diagram showing an example of the functional configuration of the correction factor calculation processing section 301 according to this exemplary embodiment.

As shown in FIG. 3, the correction factor calculation processing section 301 has preprocess sections 311 and 321, feature region extracting sections 312 and 322, feature amount calculating sections 313 and 323, position calculating sections 314 and 324, feature-region-information storage section 315 and 325, a first selecting section 331, a second selecting section 332, a similarity selection criterion setting section 333, a correction factor calculating section 334 and a table conversion section 335. The correction factor calculation processing section 301 has such a configuration that processings of the function sections are executed under the control of the CPU 31 (see FIG. 1).

The preprocess section 311, the feature region extracting section 312, the feature amount calculating section 313, the position calculating section 314 and the feature-region-information storage section 315 process the image data (original image data) of the image 'a' input from the first image data input section 10. The preprocess section 321, the feature region extracting section 322, the feature amount calculating section 323, the position calculating section 324 and the feature-region-information storage section 325 process the image data (scan image data) of the image 'b'.

Specifically, the preprocess sections 311 and 321 perform a monochromizing process and binarization processing for the original image data and the scan image data. The monochromizing process is a process of converting a color image into a grayscale image of black and white, such as a process of converting color image data into image data only having brightness information. The binarization processing is a process of converting a monochrome image into either of a logical value "1" (black) or a logical value "0" (white) based on a predetermined threshold level. Therefore, the monochromizing process is not required when the input image is a monochrome image. Also, both of the monochromizing process and the binarization processing are not required when the input image data is binary data.

The feature region extracting sections 312 and 322 extract feature regions of the images from the preprocessed image data. If a black-run region where black pixels appear continuously or a white-run region where white pixels appear continuously (hereinafter, such regions will be referred to as "continuous regions") in a text or a symbol of a binarized image is defined as a feature of the image, a "feature region of an image" means a circumscribed rectangular region, which circumscribes the continuous region. If an intersection between ruled lines of a table is defined as a feature of an image, a "feature region of an image" is a predetermined region having the intersection as its center, for example.

In the case where a feature of an image is the continuous region, for example, a range (maximum, minimum) having a predetermined size (in area or in number of pixels) is set as an extraction condition in advance and then extraction of feature regions is executed based on predetermined setting condition such as a region, in the range, where the same pixel value continuously appears.

Figure 4:
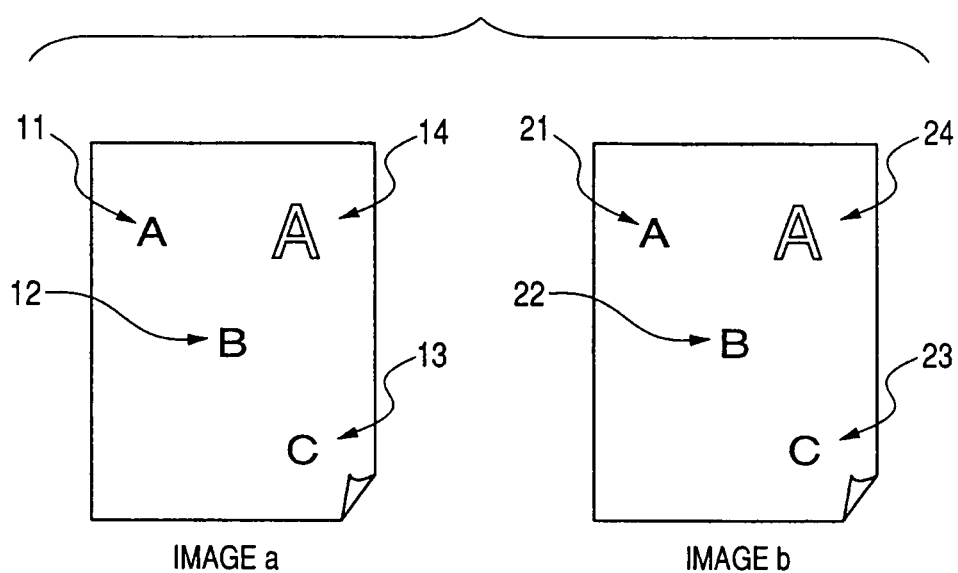
FIG. 4 is an explanatory view of a specific example of feature regions.

Specific examples of the feature regions extracted by the extraction processing executed by the feature region extracting sections 312 and 322 will be described with reference to FIG. 4. FIG. 4 shows images 'a' and 'b' to which the binarization processing has been applied. The feature region extracting sections 312 and 322 extract, from the images 'a' and 'b', image data having a black run (black pixels appearing continuously) and image data having a white run (white pixels appearing continuously) as continuous regions under predetermined conditions.

In the example of FIG. 4, the feature region extracting section 312 extracts black letter images A, B and C and an outline letter A from the image 'a' as continuous regions 11 to 14. Also, the feature region extracting section 322 extracts black letter images A, B and C and an outline letter A from the image 'b' as continuous regions 21 to 24. In the actual processing, each of the feature region extracting sections 312 and 322 may extract several hundreds to several thousands of continuous regions depending on the setting conditions.

The feature amount calculating sections 313 and 323 calculate feature amounts of the feature regions extracted by the feature region extracting sections 312 and 322. The "feature amount" may include a width, a height, an aspect ratio, a line length, a line area and a line width of the circumscribed rectangle.

The position calculating sections 314 and 324 calculate positions, in the respective images, of the feature regions extracted by the feature region extracting sections 312 and 322. The "position" may mean a center of the circumscribed rectangle or a density centroid of the circumscribed rectangle.

Figure 5:
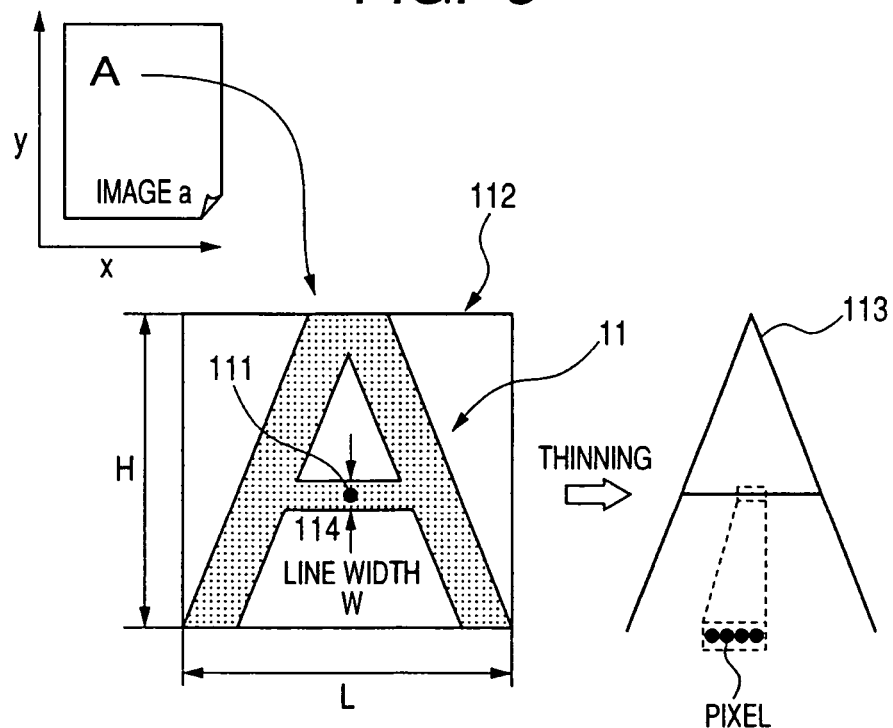
FIG. 5 is an explanatory view of a feature amount in a continuous region.

The feature amount and the density centroid in the example shown in FIG. 4 will be described with reference to FIG. 5 showing the case where the black letter "A" 11 of the image 'a' is extracted as the continuous region.

Referring to FIG. 5, a density centroid 111 is a centroid position, in density, of the black letter "A" 11, which is the continuous region. For example, it is assumed that the image 'a' is on xy coordinate plane. In this case, the density centroid is calculated as coordinate data (x, y). A width, a height, and an aspect ratio of the circumscribed rectangle is calculated as a width (L), a height (H) and an aspect ratio (H/L) of a circumscribed rectangle 112, which circumscribes the continuous region 11, respectively.

As shown in FIG. 5, a line length is calculated as number of pixels (n) of a continuous region thinned image 113 obtained by thinning the continuous region 11 until its width becomes a single pixel. That is, the line length (n) is number of pixels after thinning. A line area is calculated as number of total pixels (Nall) constituting the continuous region 11. That is, the line area (Nall) is number of the all pixels constituting the continuous region 11. A line width is a width (W) of the continuous region 11 as shown in FIG. 5, which is calculated as number of pixels or a length.

As apparent from the above description, the processing system for processing the original image data, which includes the preprocess section 311, the feature region extracting section 312, the feature amount calculating section 313 and the position calculating section 314, and the processing system for processing the scan image data, which includes the preprocess section 321, the feature region extracting section 322, the feature amount calculating section 323 and the position calculating section 324 are different in image data to be processed but perform basically the same processing. That is, though FIG. 3 shows the two-line processing systems for the purpose of facilitating understanding, each processing is executed by one of the processing systems in a time sharing manner in the actual processing.

The feature-region-information storage sections 315 and 325 associate (i) the feature amount information of the images 'a' and 'b' calculated by the feature amount calculating sections 313 and 323 and (ii) the positions of the feature regions calculated by the position calculating sections 314 and 324 with the feature regions to store the feature amount information and the positions of the feature regions as feature region tables. Since feature-region-information storage sections 315 and 325 associate the feature amount information and the positions of the feature regions with the feature regions and temporarily store as the feature region tables, it is possible to output the feature region tables repeatedly to a process loop at the next stage.

For example, as shown in FIG. 6, in each feature region table, identifiers (ID) are assigned to the respective feature regions extracted from the images 'a' and 'b'. Also, the feature amount information of each feature region (that is, the width, height, aspect ratio, line length, line area, line width, and position information (density centroid) of the circumscribed rectangle) is associated with the corresponding feature region ID.

The first selecting section 331 refers to the feature region tables stored in the feature-region-information storage sections 315 and 325 to select each pair of feature regions, which are estimated to be common in the two images 'a' and 'b', based on similarity in feature amount. Specifically, the first selecting section 331 selects, as a pair of feature regions, corresponding feature regions in the two images 'a' and 'b' satisfying that a feature amount of one of the corresponding feature regions is in a predetermined range or in a range of the similarity selection criteria of the feature amount, which is set by the similarity selection criterion setting section 333, with respect to the other of the corresponding feature regions. Then, the first selecting section 331 outputs the selected pairs of feature regions as a first feature region pair list.

The second selecting section 332 further narrows down the pairs of feature regions in the first feature regions pair list output from the first selecting section 331, based on similarity in a relative position relation between the feature regions of each pair. Then, the second selecting section 332 outputs the resultant pairs of feature regions as a second feature region pair list. An operation of the second selecting section 332 will be described in more detail later.

The similarity selection criterion setting section 333 sets the similarity selection criteria of the feature amount and/or the similarity selection criteria of the relative positional relation with respect to the first selecting section 331 and/or the second selecting section 332. The similarity selection criterion setting section 333 surely finds a large number of pairs of feature regions by widening or narrowing a range of the selection criteria as described later to improve accuracy in position alignment.

The similarity selection criteria of the feature amount set the similarity selection criterion setting section 333 with respect to the first selecting section 331 may include the following three selection criterion categories:

(a) search range of pairs of feature regions;

(b) number of types of feature amount information to be compared; and (c) concordance degree of feature amount information to be compared.

The similarity selection criteria of the relative positional relation set by the similarity selection criterion setting section 333 with respect to the second selecting section 332 will be described later together with the configuration and operation of the second selecting section 332.

Figure 7:
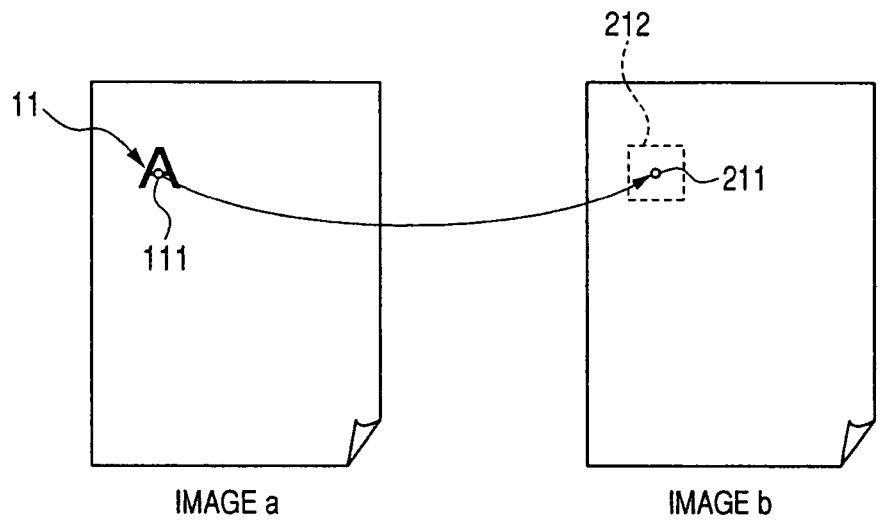
FIG. 7 is an explanatory view of a search range in a pair of feature regions.

As shown in FIG. 7, the search range of pairs of feature regions (a) is, for example, a search range 212. A coordinate position of the image 'b' corresponding to a coordinate of the density centroid 111 of one of the continuous regions 11 of the image 'a' is selected as a centroid corresponding position 211. A range where a feature amount, which is same as that of the continuous region 11, is search for around the centroid corresponding position 211 is set as the search range 212.

The number of types of feature amount information to be compared (b) is number of types of feature amounts, which are set as comparison objects among the feature amounts such as the width, the height, the aspect ratio, the line length (number of constituent pixels after thinning), the line area (pixels in continuous region) and the line width of the circumscribed rectangle as shown in FIG. 6.

The concordance degree of feature amount information to be compared (c) is a degree used in judging as to whether or not feature regions extracted from the respective images 'a' and 'b' are selected as a pair of feature regions based on to what extent the feature regions extracted from the respective images 'a' and 'b' match in a certain type of feature amount to be compared. For example, it is assumed that feature amount information to be compared is a width of a circumscribed rectangle. In this case, to judge as to whether or not feature regions extracted from the respective images 'a' and 'b' are selected as a pair of feature regions, the concordance degree of feature amount information to be compared (c) is compared with an extent to what a width of a circumscribed rectangle of one continuous region selected from the image 'a' matches that of one continuous region selected from the image 'b'.

The correction factor calculating section 334 calculates correction factors, which are to be used in the affine transformation (image conversion), based on the second feature region pair list narrowed down by the second selecting section 332. The correction factors to be used in the affine transformation may include a widthwise displacement (X), a lengthwise displacement (Y), a rotation angle ($\theta$) and a magnification factor ($\beta$). The correction factor calculating section 334 calculates the correction factors to be used in the affine transformation so that the correction factors minimize a shift amount between the two images 'a' and 'b', for example, an error in position of the density centroid, when the affine transformation is executed for one of the images based on the correction factors.

Specifically, the correction factor calculating section 334 obtains, by the least square method, values of a widthwise displacement (X), a lengthwise displacement (Y), a rotation angle ($\theta$) and a magnification factor ($\beta$) so that the correction factors minimizes a sum of errors in position of density centroid between the two images 'a' and 'b'. The process for calculating correction factors by the least square method is disclosed in JP Hei. 9-93431 A (corresponding to U.S. Pat. No. 6,549,681), for example. The correction factors for the affine transformation calculated ultimately by the correction factor calculating section 334 are supplied to the image position aligning section 302 shown in FIG. 2 as alignment parameters.

The table conversion section 335 performs table conversion by performing the affine transformation for the feature region table of the scan image 'b' stored in the feature-region-information storage section 325 on the list in accordance with the correction factors for the affine transformation calculated by the correction factor calculating section 334. The table conversion is executed as a process of updating the feature amounts recorded in the feature region table shown in FIG. 6.

That is, after selecting the feature region table of one of the images 'a' and 'b' (image 'b' in this exemplary embodiment), for which a process of correcting position shift will be executed, from the feature region tables shown in FIG. 6, the feature amounts (numerical value data) recorded in the selected feature region table are updated to values obtained by executing the affine transformation based on the correction factors calculated by the correction factor calculating section 334. It is noted that the feature region table is a table of numerical value data. Therefore, the conversion operation in the table conversion section 335 is completed in a remarkably short time since the calculation amount is remarkably small as compared with an operation of converting image data.

The feature amounts obtained by the feature amount calculating sections 312 and 322, that is, positions of density centroids; and widths, heights, aspect ratios, line lengths, line areas and line widths of the circumscribed rectangles are stored as the numerical value data in the feature region tables. The table conversion section 335 performs the conversion processing for at least the positions of the density centroids among the feature amounts. If a magnification factor of the correction factors of the affine transformation is not equal to 1.0, that is, if one of the images 'a' and 'b' is enlarged or reduced, it is possible to find a pair of feature regions more reliably by multiplying the feature amounts other than the positions of the density centroids by the magnification factor and performing the table conversion.

(Configuration and Operation of Second Selecting Section)

Hereinafter, the specific configuration and operation of the second selecting section 332 will be described in detail.

Figure 8:
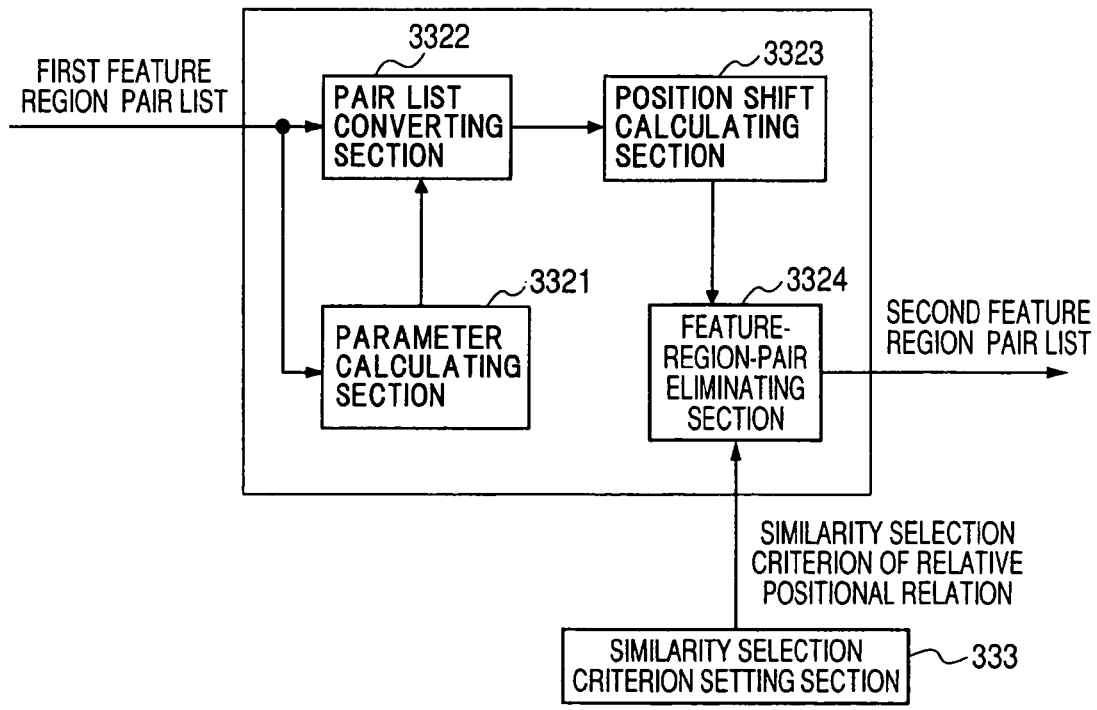
FIG. 8 is a block diagram showing an example of the functional configuration of a second selecting section.

FIG. 8 is a block diagram showing an example of the functional configuration of the second selecting section 332. As shown in FIG. 8, the second selecting section 332 according to this configuration example has a parameter calculating section 3321, a pair list converting section 3322, a position shift calculating section 3323 and a feature-region-pair eliminating section 3324.

The parameter calculating section 3321 has a configuration, which is basically the same as that of the correction factor calculating section 334. The parameter calculating section 3321 calculates parameters (correction factors for the affine transformation) for position alignment from the first feature region pair list output from the first selecting section 331. The pair list converting section 3322 performs the affine transformation for data indicating the positions of the feature regions derived from one of the images 'a' and 'b' in the first feature pair list output from the first selecting section 331 (specifically, data indicating the positions of the density centroids) on the list in accordance with the position alignment parameters calculated by the parameter calculating section 3321. The position shift calculating section 3323 calculates a value (position shift amount itself or a square of the position shift amount) corresponding to a position shift between the feature regions of each pair from the feature region pair list for which the pair list converting section 3322 has performed the affine transformation.

The feature-region-pair eliminating section 3325 narrows down the pairs of feature regions by eliminating, from the feature region pair list, pairs of feature regions whose position shift amount calculated by the position shift calculating section 3323 is larger than a predetermined criterion value as pairs of feature regions that lacks similarity in relative positional relation with other pairs of feature regions whose position shift amount is equal to or smaller than the predetermined criterion value (similarly selection criterion for relative positional relation). The feature-region-pair eliminating section 3325 then outputs the ultimately narrowed pairs of feature regions to the correction factor calculating section 334 shown in FIG. 3 as a second feature region pair list. The predetermined criterion value used as a judgment criterion for eliminating the pairs of feature regions from the feature region pair list is the similarity selection criteria of the relative positional relation that is set by the similarity selection criterion setting section 333 to the second selecting section 332.

The second selecting section 332 having this configuration repeatedly executes the respective processings executed by the respective sections. That is, the correction factor calculating section 3321 executes the process of calculating the correction factors, the pair list converting section 3322 performs the pair list conversion, the position shift calculating section 332 calculates the position shift, the feature-region-pair eliminating section 3325 eliminates pairs of feature regions.

By performing the processings repeatedly, pairs of feature regions that lack similarity in relative positional relation with the other pairs of feature regions are eliminated from the first feature region pair list. That is, pairs of feature regions that have been listed up by the first selecting section 331 although they are not essentially true pairs of feature regions, are gradually eliminated from the first feature region pair list including pairs of feature regions which are estimated to be common in the two images 'a' and 'b' by the first selecting section 331 based on similarity in feature amount. The repetitive processings are ordinarily performed until there is no pair of feature regions to be eliminated. However, the invention is not limited to this processing. The repetitive processing may be performed certain number of times.

In the correction factor calculation processing section 301 including the second selecting section 332 of the above-described configuration, the processing path of the feature-region-information storage section 325→the first selecting section 331→the second selecting section 332→the correction factor calculating section 334→the table conversion section 335→the feature-region-information storage section 325 forms a detection process loop for performing the process of detecting the position shift amount between the two images 'a' and 'b' as the correction factors (position alignment parameters) for the affine transformation.

In this detection process loop, at least two stages of processes including a rough adjustment process for detecting rough correction factors and a fine adjustment process for detecting correction factors involving a small position shift amount from the rough correction factors are performed as a process for detecting the correction factors for the affine transformation. Further, with regard to the rough adjustment process and the fine adjustment process, the rough adjustment process may be performed plural times, and the fine adjustment process may be performed plural times.

The constituent elements of the correction factor calculation processing section 301, that is, the preprocess sections 311 and 321, the feature region extracting sections 312 and 322, the feature amount calculating sections 313 and 323, the position calculating sections 314 and 324, the feature-region-information storage sections 315 and 325, the first selecting section 331, the second selecting section 332, the similarity selection criterion setting section 333, the correction factor calculating section 334 and the table conversion section 335, may be implemented as a software configuration by using a computer device such as a PC (personal computer) that executes functions such as information storage processing, image processing and arithmetic processing by executing predetermined programs. However, the invention is not limited to the software configuration. The constituent elements may be implemented as a hardware configuration or a combined configuration of hardware and software.

In the case of the realization by software configuration, a program causing the computer to function as the preprocess sections 311 and 321, the feature region extracting sections 312 and 322, the feature amount calculating sections 313 and 323, the position calculating sections 314 and 324, the feature-region-information storage sections 315 and 325, the first selecting section 331, the second selecting section 332, the similarity selection criterion setting section 333, the correction factor calculating section 334, and the table conversion section 335 is the image processing program according to this invention.

Also, a program executing processings of steps in an image processing sequence described below is the image processing program according to this invention. The image processing program may be pre-installed in the computer. Note that the program is not limited to that pre-installed in the computer and may be stored in a recording medium that can be read by the computer or distributed by wired or wireless communication means.

(Process of Calculating Correction Factor)

Figure 9:
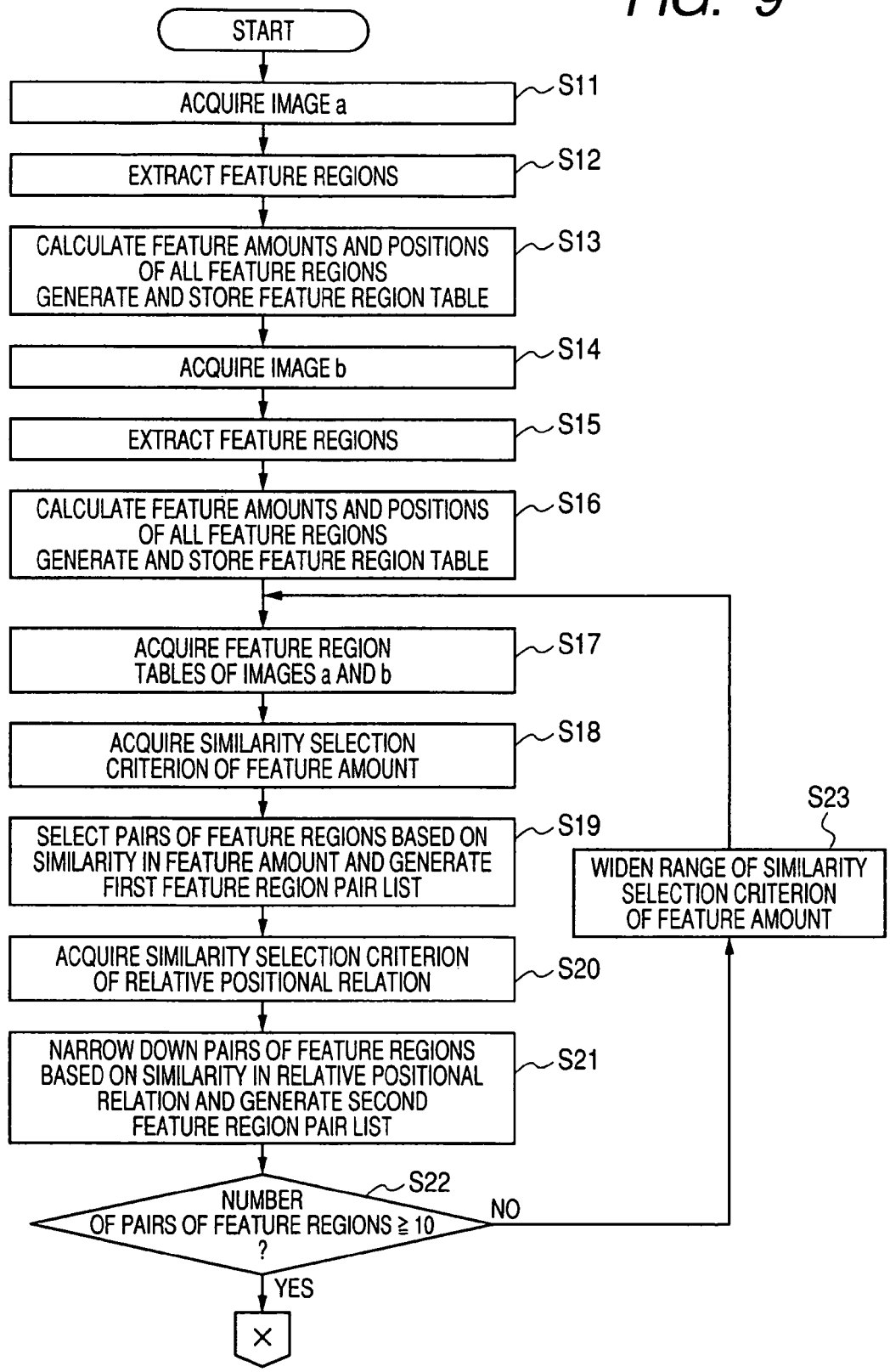
FIG. 9 is a flowchart (part 1) showing an example of a sequence of a process for obtaining correction factors.
Figure 10:
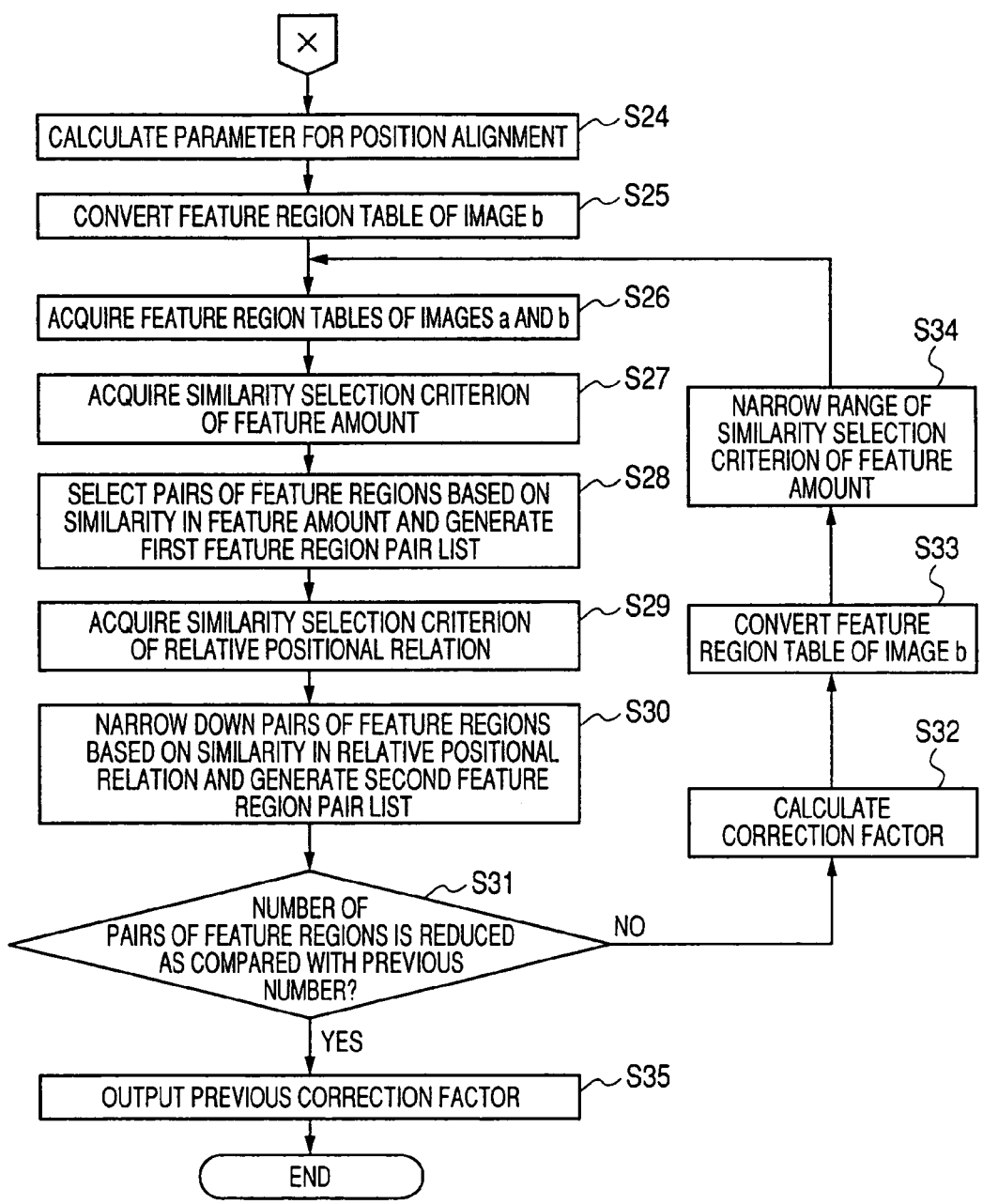
FIG. 10 is a flowchart (part 2) showing the example of the sequence of the process for obtaining the correction factors.

Hereinafter, an example of sequence of a method for obtaining the correction factors for position alignment will be described with reference to flowcharts of FIGS. 9 and 10. The process of obtaining correction factors for position alignment may be executed by the correction factor calculation processing section 301 shown in FIG. 3.

In the process of obtaining the correction factors, at least two stages of processes including a rough adjustment process for detecting rough correction factors and a fine adjustment process for detecting correction factors involving a small position shift amount from the rough correction factors are performed as a process for detecting the correction factors for the affine transformation. Further, with regard to the rough adjustment process and the fine adjustment process, the rough adjustment process may be performed plural times, and the fine adjustment process may be performed plural times.

At first, the feature region extracting section 312 obtains image data of an image 'a', which is used as an original image, (Step S11) and then extracts feature regions of the image 'a' based on the obtained image data (Step S12). Then, the feature amount extracting section 313 calculates feature amounts (for example, width, height, aspect ratio, line length, line are and line width of each circumscribed rectangle). The position calculating section 314 calculates positions of all the feature regions (positions of density centroids of the feature regions). The feature-region-information storage section 315 associates the calculated feature amounts and the calculated positions with the feature regions, generates a feature region table for the image 'a' and stores the feature region table (Step S13).

Next, the feature region extracting section 322 obtains image data of an image 'b', which is used as a scan image (Step S14), and extracts feature regions of the image 'b' based on the obtained image data (Step S15). Then, the feature amount calculating section 323 calculates feature amounts, and the position calculating section 324 calculates positions of all the feature regions. Then, the feature-region-information storage section 325 associates the calculated feature amounts and the calculated positions with the feature regions, generates a feature region table for the image 'b', and stores the feature region table in a memory (Step S16).

Then, the first selecting section 331 obtains the feature region tables for the images 'a' and 'b' (Step S17), and also obtains a similarity selection criteria of the feature amount (set by the similarity selection criterion setting section 333 shown in FIG. 3; Step S8). The first selecting section 331 selects pairs of feature regions, which are similar to each other in a certain type of feature amount, from the feature region tables based on the obtained similarity selection criteria of the feature amount, and generates a first feature region pair list (step S19). This is the first time the first selecting section 331 executes the process of generating the first feature region pair list.

Then, the second selecting section 332 obtains a similarity selection criteria of the relative positional relation (set by the similarity selection criterion setting section 333 shown in FIG. 3; Step S20). The second selecting section 332 narrows down the pairs of feature regions in the first feature region pair list in terms of the similarity in relative positional relation based on the obtained similarity selection criteria of the relative positional relation and generates a second feature region pair list (Step S21). This is the first time the second selecting section 332 executes the process of generating the second feature region pair list.

Then, the second selecting section 332 judges as to whether or not number of the pairs of feature regions in the second feature region pair list is equal to or larger than a predetermined value such as 10 (Step S22). If less than 10, the similarity selection criterion setting section 333 widens a range of the similarity selection criteria of the feature amount (Step S23). Thereafter, the first and second selecting sections 331, 332 repeat a first process loop of Step S17→Step S18→Step S19→Step S20→Step S21→Step S22→Step S23→Step S17 until the number of the pairs of feature region becomes equal to or larger than 10.

That is, the first process loop of Step S17→Step S18→Step S19→Step S20→Step S21→Step S22→Step S23→Step S17 is equivalent to the rough adjustment process described above. The rough adjustment process sets the strict selection criterion for feature amount similarity, and repeats selecting (detecting) pairs of feature regions while gradually relaxing the similarity selection criteria of the feature amount until the number of the pairs of feature regions becomes equal to or larger than the predetermined value.

Specifically, initial state of the similarity selection criteria of the feature amount is as follows:
(a) search range of pairs of feature regions: narrow
(b) number of types of feature amount information to be compared: arbitrary
(c) concordance degree of feature amount information to be compared: strict As described above, the similarity selection criteria of the feature amount is set strictly, and the similarity selection criterion is gradually relaxed in the course of executing the rough adjustment process repeatedly until the number of the pairs of feature regions become equal to or larger than the predetermined value.

In step S23, the rough adjustment process gradually widens only the range of the similarity selection criteria of the feature amount (relaxes the criterion). However, the rough adjustment process may further relax the similarity selection criteria of the relative positional relation (judgment criterion for eliminating pairs of feature regions as those pairs lacking relative positional relation).

When the second selecting section 332 judges that the number of the pairs of feature regions has become equal to or larger than 10 in Step S22, the correction factor calculating section 334 calculates the correction factors to be used for the affine transformation, that is, a widthwise displacement (X), a lengthwise displacement (Y), a rotation angle (θ) and a magnification (β) (Step S24). Then, the table conversion section 335 performs the affine transformation for the feature region table of the image 'b' on the list in accordance with the correction factors calculated in Step S24 to convert the table (Step S25).

Then, the fine adjustment process described above is started. In the fine adjustment process, processes similar to those in the rough adjustment process are repeatedly executed while narrowed is a range of the similarity selection criteria of the feature amount ultimately set by the rough adjustment process relaxedly.

At first, the firsts selecting section 331 obtains the feature region tables of the images 'a' and 'b' (Step S26), and obtains the similarity selection criteria of the feature amount ultimately set by the rough adjustment process (set by the similarity selection criterion setting section 333 shown in FIG. 3; Step S27). Then, the first selecting section 331 selects pairs of feature regions in terms of similarity in feature amount based on the obtained similarity selection criteria of the feature amount to generate a first feature region pair list (Step S28). This is the second time the first selecting section 331 executes the process of generating the first feature region pair list (see also Step S19)

Then, the second selecting section 332 obtains the similarity selection criteria of the relative positional relation (set by the similarity selection criterion setting section 333 shown in FIG. 3; Step S29). Then, the second selecting section 332 narrows down the pairs of feature regions in the first feature region pair list in terms of similarity in relative positional relation based on the obtained similarity selection criteria of the relative positional relation to generate a second feature region pair list (Step S30). This is the second time the second selecting section 332 executes the process of generating the second feature region pair list (see also Step S21).

Then, the second selecting section 332 judges as to whether or not number of the pairs of feature regions in the second feature region pair list is largely reduced as compared with the number of the pairs of feature regions in the second feature region pair list generated previously (hereinafter simply referred to as "previous number"), for example, as to whether or not reduced by about 20% (Step S31). If not largely reduced, the correction factor calculating section 334 calculates correction factors to be used for the affine transformation (Step S32). At step S32, the correction factor calculating section 334 calculates the correction factors to be used for the affine transformation in the same manner as Step S24.

Then, the table conversion section 335 performs the affine transformation for the feature region table of the image 'b' on the list in accordance with the correction factors calculated in Step S32 to convert the table (Step S33). At Step S33, The table conversion section 335 converts the feature region table in the same manner as Step S25. Next, the similarity selection criterion setting section 333 narrows the range of the similarity selection criteria of the feature amount (Step S34). The first and second selecting sections 331, 332 repeat a second process loop of Step S26→Step S27→Step S28→Step S29→Step S30→Step S31→Step S32→Step S33→Step S34→Step S26. The number of the pairs of feature regions in the second feature region pair list is stored, and the second process loop is repeated until the number of the pairs of feature regions pairs currently extracted is largely reduced as compared with the number (about 200) of the pairs of feature regions extracted for the previous time.

When the second selecting section 332 judges that the number of the pairs of feature regions in the second feature region pair list is largely reduced as compared with the previous number, the correction factor calculating section 334 outputs the correction factors for the affine transformation used when generating the previous second feature region pair list (previous correction factors), as position alignment parameters (Step S35). Thus, the series of processes for obtaining the correction factors to be used for the affine transformation (image conversion) are completed.

Figure 11:
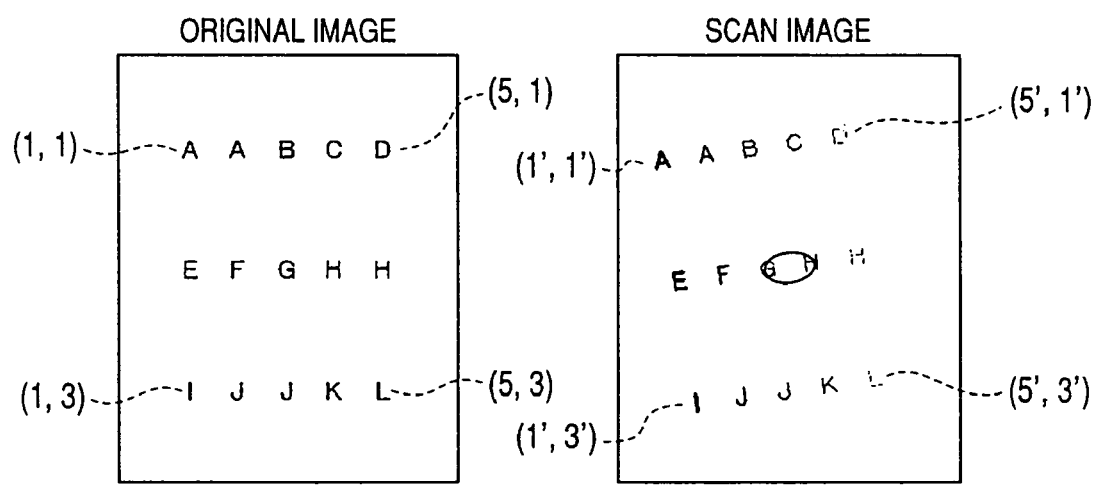
FIG. 11 is an explanatory view showing, as images, contents of the feature region tables, which correspond to an input original image and a scan image.
Figure 12:
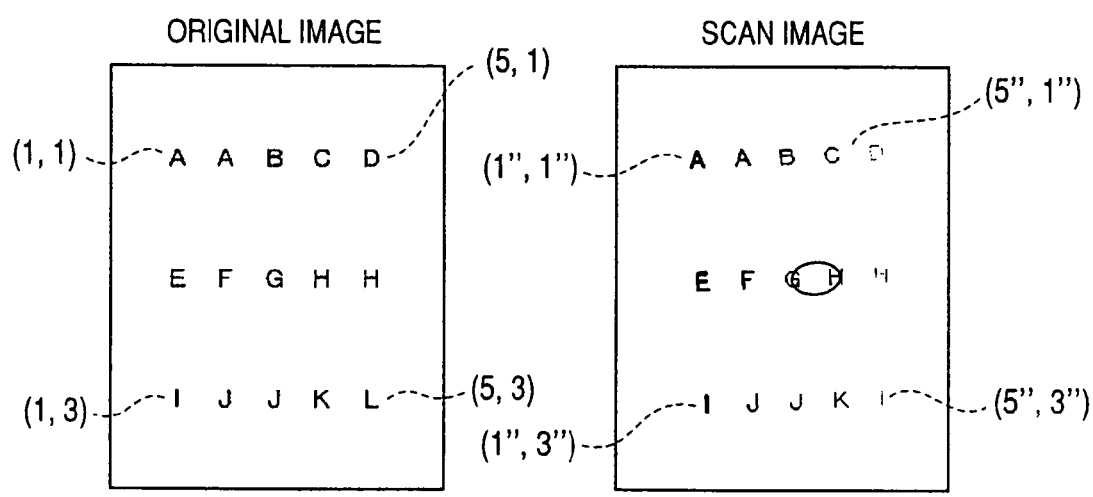
FIG. 12 is an explanatory view showing a state after a rough adjustment process is completed.
Figure 13:
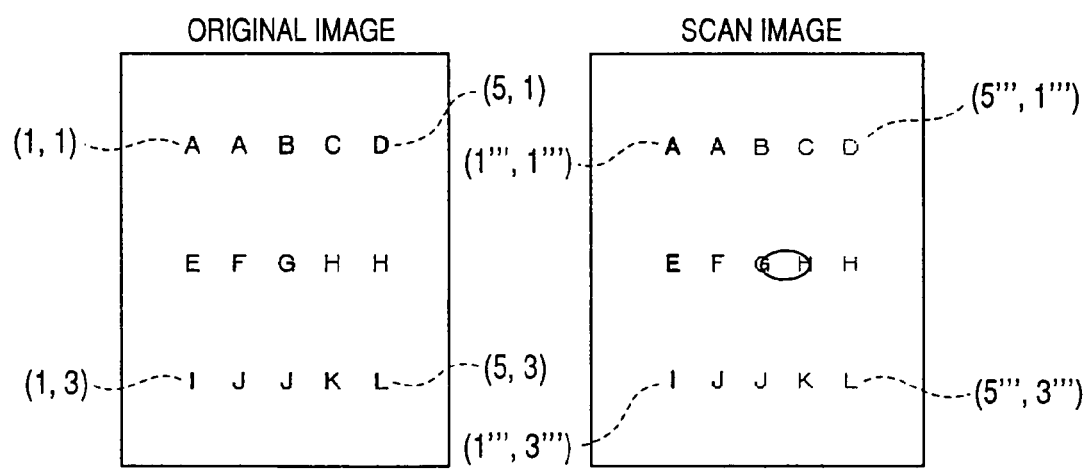
FIG. 13 is an explanatory view showing a state after a fine adjustment process is completed.

FIGS. 11 to 13 show change in association relations in the images 'a' and 'b' as the process proceeds to the rough adjustment process (Step S17→Step S18→Step S19→Step S20→Step S21→Step S22→Step S23→Step S17), Step S24, Step S25 and the fine adjustment process (Step S26→Step S27→Step S28→Step S29→Step S30→Step S31→Step S32→Step S33→Step S34→Step S26). Although the association relations are indicated in the images 'a' and 'b' in order to facilitate understanding, the association relations are established between the feature region tables in the actual process.

FIG. 11 shows, as images, contents of the feature region tables corresponding to the input original image and scan image. FIG. 12 shows a state after the rough adjustment process is completed. FIG. 13 shows a state after the fine adjustment process is completed.

FIG. 11 shows the input original image and scan image. The scan image is greatly misaligned from the original image. Also, the scan image is greatly deteriorated in image quality. Letters of (1', 1') A, (1', 2') E and (1', 3') I are thickened as compared with those in the original image. Further, letters of (3', 1') B, (3', 2') G, (3', 3') J, (4', 1') C, (4', 2') H and (4', 3') K are thinned as compared with those in the original image. A circle is added over the letters (3', 2') G and (4', 2') H. Further, letters of (5', 1') D, (5', 2') H and (5', 3') L are thinned and abraded as compared with those in the original image. Letters of (2', 1') A, (2', 2') F and (2', 3') J are not deteriorated in image quality.

At first, the rough adjustment process will be described. The rough adjustment process is terminated to proceed to the fine adjustment process when five or more feature regions are associated.

Referring to FIG. 11, when the first selecting section 331 associates feature regions, since the strict similarity selecting criterion of the feature amount is initially set, the feature regions having small deterioration in image quality are associated. That is, a pair of (1, 1) A and (2', 1') A, a pair of (2, 2) F and (2', 2') F and a pair of (2, 3) J and (2', 3') J are obtained as pairs of feature regions.

Next, the second selecting section 332 checks similarity between the feature regions of each pair in relative positional relation, and eliminates a pair of feature regions, which is greatly different from the other pairs of feature regions. Thereby, the pair of (1, 1) A and (2', 1') A, which are erroneously associated with each other, is eliminated. Then, since the number of feature regions becomes equal to or less than five, the similarity selection criteria of the feature amount is relaxed to perform the rough adjustment process again.

In the second rough adjustment process, the first selecting section 331 obtained, as pairs of feature regions, a pair of (1, 1) A and (2', 1') A, a pair of (2, 1) A and (2', 1') A, a pair of (3, 1) B and (3', 1') B, a pair of (4, 1) C and (4', 1') C, a pair of (1, 2) E and (1', 2') E, a pair of (2, 2) F and (2', 2') F, a pair of (1, 3) I and (1', 3') I, a pair of (2, 3) J and (2', 3') J, a pair of (3, 3) J and (2', 3') J and a pair of (4, 3) K and (4', 3') K.

Because of the relaxed similarity selection criteria of the feature amount, feature regions are associated irrespective of slight image deterioration.

Next, the second selecting section 332 checks the similarity between the feature regions of each pair in relative positional relation and eliminates a pair of feature regions that are difference in relative positional relation from the pairs of feature regions. Thereby, the pair of (1, 1) A and (2', 1') A and the pair of (3, 3) J and (2', 3') J are eliminated.

Then, since the number of associated feature regions is equal to or more than five, the correction factors for affine transformation are obtained, and the affine transformation is performed for the feature regions in the scan image on the feature region table of the scan image. Then, the rough adjustment process is terminated.

FIG. 12 shows, as images, the contents of the feature region table at the time when the rough adjustment process is completed. It is apparent that the misalignment in the scan image is reduced by the rough adjustment process.

Next, the fine adjustment process is started. Hereinafter, an example of the fine adjustment process in which the similarity selection criteria of the feature amount is further relaxed will be described with reference FIG. 12.

The first selecting section 331 obtains, as pairs of feature regions, a pair of (1, 1) A and (1", 1") A, a pair of (2, 1) A and (2", 1") A, a pair of (3, 1) B and (3", 1") B, a pair of (4, 1) C and (4", 1") C, a pair of (5, 1) D and (5", 1") D, a pair of (1, 2) E and (1", 2") E, a pair of (2, 2) F and (2", 2") F, a pair of (5, 2) H and (5", 2") H, a pair of (1, 3) I and (1", 3") I, a pair of (2, 3) J and (2", 3") J, a pair of (3, 3) J and (3", 3") J, a pair of (4, 3) K and (4", 3") K and a pair of (5, 3) L and (5", 3") L.

Since the similarity selection criteria of the feature amount is further relaxed, feature regions, which are greatly deteriorated in image quality, can be associated. (3", 2") G and (4", 2") H, which are changed largely in feature amount because of writing information thereto, are never associated.

Next, the second selecting section 332 checks the similarity between the feature regions of each pair in relative positional relation and eliminates a pair of feature regions whose relative position is different from those of the other pairs of feature regions. In this example, since there is no pair of feature regions, which are erroneously associated, the second selecting section 332 eliminates no pair of feature regions.

Based on the pairs of thus-associated feature regions, the correction factor calculating section 334 calculates affine transformation factors, and the table conversion section 335 performs the affine transformation for the feature amounts of the scan image in the feature amount table. Then, the fine adjustment process is performed again.

In this example, when the fine adjustment process is performed for the second and subsequent time, the process is repeated while the similarity selection criteria of the feature amount is set more strictly to the contrary.

Initially, the feature regions associated by the first selecting section 331 and the second selecting section 332 are the same as those associated for the first time, and the operations of the correction factor calculating section 334 and the table conversion section 335 are the same as those for the first time. However, as the similarity selection criteria of the feature amount gets more strict, (5", 1") D, (5", 2") H and (5", 3") L are not associated by the first selecting section because they are greatly deteriorated in image quality. Thus, the number of the pairs of feature regions is largely reduced. A result of the process at step S31 shown in FIG. 10 becomes "Yes," and the fine adjustment process is terminated. FIG. 13 shows an image representing contents of the feature region table after the fine adjustment process is completed.

In the above case, the affine transformation factors to be ultimately adopted are data obtained by the fine adjustment process just previous to the fine adjustment process in which the number of the pairs of feature regions is reduced.

In the above fine adjustment process, a range of only the similarity selection criteria of the feature amount is narrowed gradually in Step S34. Furthermore, the similarity selection criteria of the feature amount (a criterion value used when a pair of feature values is eliminated as a pair not similar to the other pairs) may be narrowed gradually as well.

Also, in the process at step S34, the range of the similarity selection criteria of the feature amount is narrowed. Alternatively, among the similarity selection criteria of the feature amount, the search range of the pair of feature regions may be narrowed in a stepwise manner from a size of the search range ultimately set by the rough adjustment process. Thereby, an object of the rough adjustment process loop can also be achieved. In this case, the other similarity selection criteria of the feature amount, for example, the concordance degree of the feature amount information to be compared, may be fixed or may be narrowed in a stepwise manner as with the search range of the pair of feature regions and then relaxed in the middle of the process.

In the above exemplary embodiment, described is the example where the image processing apparatus is configured to control so that in the rough adjustment process, the similarity selection criteria of the feature amount are gradually changed from the strict setting to the relaxed setting and in the fine adjustment process, the similarity selection criteria of the feature amount are gradually changed from the relaxed setting that is ultimately set by the rough adjustment process to the relaxed setting. It should be noted that the control of the rough adjustment process and the fine adjustment process is not more than one example and is not limited to the above. Another example of the control of the rough adjustment process and the fine adjustment process will be described below.

(Another Example of Control of Rough Adjustment Process and Fine Adjustment Process)

In this control example, changes in settings for the similarity selection criteria of the feature amount will be described. In the plural detection process loops of the feature-region-information storage section 325→the first selecting section 331→the second selecting section 332→the correction factor calculating section 334→the table conversion section 335→the feature-region-information storage section 325, the similarity selection criterion setting section 333 of the correction factor calculation processing section 301 shown in FIG. 3 changes settings of the similarity selection criterion of the feature amount in the first selecting section 331 each time detection process loop is performed.

Specifically, in the rough adjustment process initially performed, the similarity selection criterion setting section 333 sets strict similarity selection criteria. That is, when the feature region tables for the two images 'a' and 'b' shown in FIG. 6 are input to the first selecting section 331 and the first selecting section selects pairs of feature regions based on the feature amount information recorded in the input tables, the number of types of the feature amount information to be compared is increased or only feature regions having a remarkably high concordance degree in feature amount information is extracted as a pair of feature regions.

On the other hand, in the fine adjustment process executed in the latter half, the similarity selection criterion setting section 333 sets relaxed selection criteria. That is, in the first selecting section 331, the number of types of the feature amount information to be compared is reduced or the concordance degree in feature amount information is relaxed to perform the detection process.

Referring to FIG. 14, transition of the similarity selection criteria set by the similarity selection criterion setting section 333 to the first selecting section 331 will be described. The example shown in FIG. 14 is a mode of settings of similarity selection criteria when the first selecting section 331 performs the process of selecting pairs of feature regions n times from the first time to nth time in the first selecting section 331. The first half of the n times of processes corresponds to the rough adjustment process, and the latter half of the processes corresponds to the fine adjustment process.

The similarity selection criterion setting section 333 sets as follows in the first half of the processes (rough adjustment process):
(a) search range of pairs of feature regions: wide
(b) number of types of feature amount information to be compared: arbitrary
(c) concordance degree in feature amount information to be compared: strict.

Also, the similarity selection criterion setting section 333 sets as follows in the latter half of the processes (fine adjustment process):
(a) search range of pairs of feature regions: narrow
(b) number of types of feature amount information to be compared: arbitrary
(c) concordance degree in feature amount information to be compared; relaxed.

This is because even if a shift amount between the two images 'a' and 'b' is quite large, the search range of pairs of feature regions is set wide in the initial rough adjustment process to thereby facilitate detecting of a pair of similar feature regions. However, since possibility that many candidates of pairs of feature regions for one feature region are detected is increased, the concordance degree in feature amount information to be compared is set to the strict value in order to detect pairs of feature regions more reliably.

On the other hand, in the fine adjustment, the detection region used in the process of detecting pairs of feature regions, that is, the search range is narrowed to perform a process of detecting pairs of feature regions based on the process result of the rough adjustment process. Since the search range is narrow, the possibility that many candidates of pairs of feature regions are detected is reduced. Therefore, the concordance degree in feature amount information to be compared is relaxed, that is, a condition for detecting pairs of feature regions is relaxed in order to reliably detect pairs of feature regions, which have small similarity because of deterioration in image quality caused by abrasion during scanning.

Also, in general, the number of types of feature amount information to be compared is increased in the rough adjustment process to detect pairs of feature regions more reliably. Also, the number of types of feature amount information to be compared is reduced in the fine adjustment process to detect pairs of feature region as many as possible. In turn, it is assumed that a difference between the two images 'a' and 'b' in magnification factor is large. In this case, if the concordance degree is set strictly as well as increasing the number of types of feature amount information, no pair of feature regions whose feature amounts match may be found. Therefore, the types of the feature amount information to be compared is carefully determined depending on the expected position shift amount between the two images 'a' and 'b' and the strictness in concordance degree of feature amount information to be compared.

In the rough adjustment process to be initially executed, at least an aspect ratio of a circumscribed rectangle may be used as a feature amount of a feature region. By using the aspect ratio of the circumscribed rectangle as the feature amount, it is possible to detect feature regions having a similar shapes even when a difference in magnification factor between the two images 'a' and 'b' to be compared is large.

The concordance degree in the feature amount information to be compared is changed uniformly from the strict setting to the relaxed setting along with the transition from the rough adjustment process to the fine adjustment process. However, it is not necessary to uniformly change from the strict setting to the relaxed setting. An identical value may be used for both of the rough adjustment process and the fine adjustment process depending on the case.

FIG. 15 shows experimental data indicating number of pairs of feature regions selected by the first selecting section 331 in the case of changing the selection criteria set by the similarity selection criterion setting section 333 in the first selecting section 331. FIG. 15 shows the case of performing three (J=1 to 3) similarity selection processes (processes of selecting pairs of feature regions) with the selection conditions being changed as follows.

Specifically, in the first (J=1) similarity selection process, the search range of pairs of feature regions=centroid position±20 mm and the concordance degree in feature amount information to be compared=±1%. In the second (J=2) similarity selection process, the search range of pairs of feature regions=centroid position±2 mm and the concordance degree in feature amount information to be compared=±10%. In the third (J=3) similarity selection process, the search range of pairs of feature regions=centroid position±0.4 mm and the concordance degree in feature amount information to be compared=±20%. The types of feature amount information to be compared are not changed.

By performing the similarity selection process (the process of selecting pairs of feature regions) three times with the above selection criterion settings, about 10 to 20 pairs of feature regions are selected in the first similarity selection process. Then, a rough position shift amount between the two images 'a' and 'b' is calculated based on the feature amount information of the selected pairs of feature regions. The affine transformation is performed by using the calculated position shift amount as the correction factor for the affine transformation. Thereafter, the similarity selection criteria is changed by the similarity selection criterion setting section 333 to perform the second similarity selection process.

In the second similarity selection process, about 100 to 200 pairs of feature regions are selected. Based on the feature amount information of the selected pairs of feature regions, a position shift amount between the two images 'a' and 'b' is calculated to perform the second affine transformation by using the calculated position shift amount as the correction factor for the affine transformation. Thereafter, the similarity selection criteria are changed by the similarity selection criterion setting section 333 to perform the third similarity selection processing.

In the third similarity selection process, about 200 to 300 pairs of feature regions are selected. Based on the feature amount information of the selected pairs of feature regions, a position shift amount between the two images 'a' and 'b' is calculated to perform the third affine transformation by using the calculated position shift amount as the correction factor for the affine transformation. As described above, the process of selecting pairs of feature regions, which are estimated to be common in the two images 'a' and 'b' in terms of the similarity in feature amount is performed for plural times repeatedly (three times in this example).

An image processing apparatus for performing the rough adjustment process and the fine adjustment process of the other control example may select pairs of feature regions, which are estimated to be common in the two images 'a' and 'b', based on feature amounts of feature regions; narrow down the selected pairs of feature regions based on similarity in relative positional relation between the two images 'a' and 'b'; and calculate correction factors used to correct position shift between the two images 'a' and 'b', based on the narrowed pairs of feature regions.

In the above exemplary embodiment, the image processing apparatus has the detection process loop of the feature-region-information storage section 325→the first selecting section 331→the second selecting section 332→the correction factor calculating section 334→the table conversion section 335→the feature-region-information storage section 325 in the correction factor calculating process section 301. The invention may be applied to an image processing apparatus have no such a detection process loop.

Figure 16:
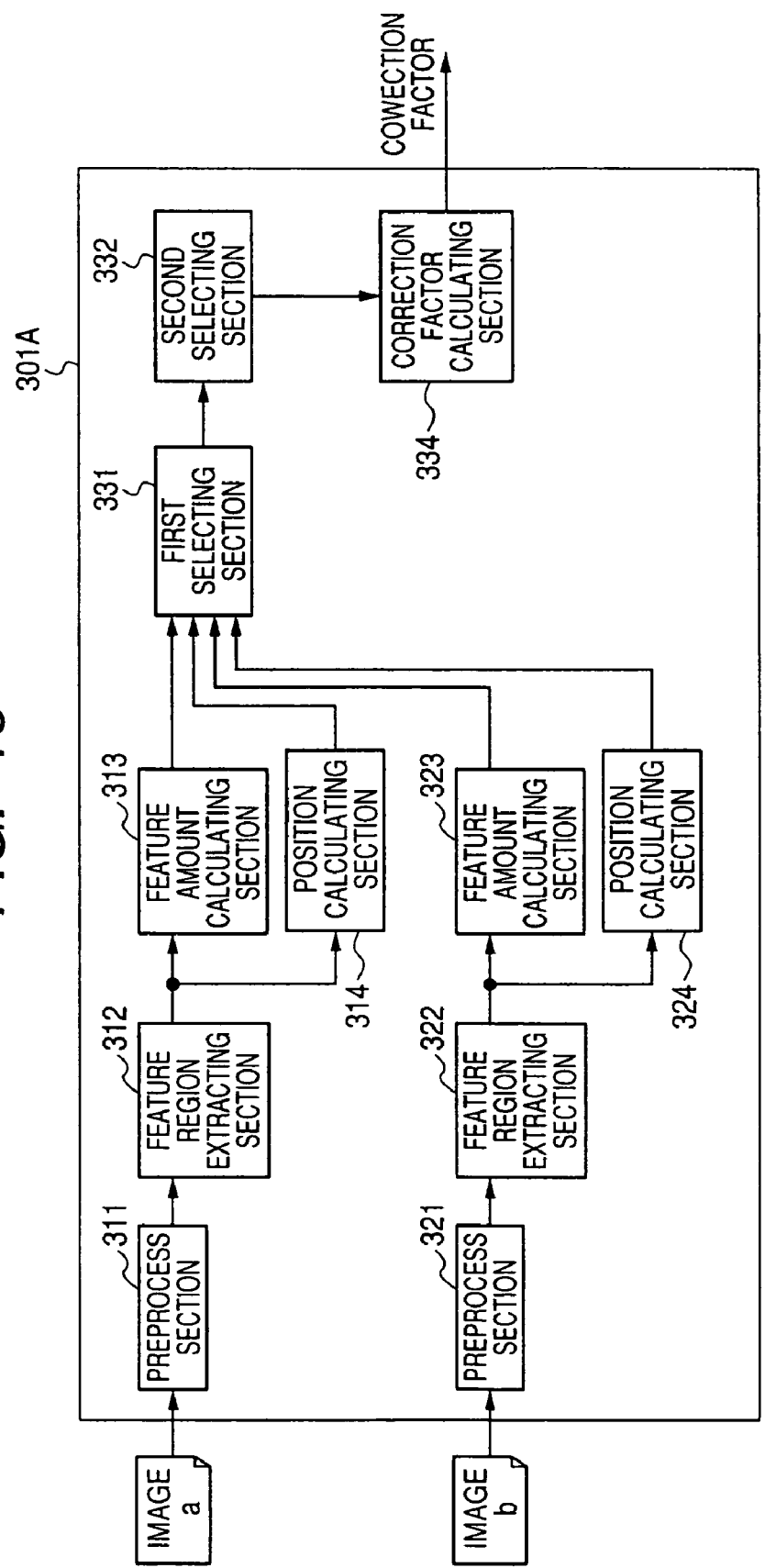
FIG. 16 is a block diagram showing an example of the functional configuration of an image position aligning section according to the basic form of this invention.

As shown in FIG. 16, an image processing apparatus may be provided with a correction factor calculating section (correction factor calculating section according to a basic configuration) only having a first selecting section 331, a second selecting section 332 and a correction factor calculating section 334 in addition to preprocess sections 311 and 321, feature region extracting sections 312 and 322 and feature amount calculating sections 313 and 323. This image processing apparatus selects pairs of feature regions, which are estimated to be common in the two images 'a' and 'b', based on feature amounts of feature regions; narrows down the selected pairs of feature regions based on similarity in relative positional relation between the two images 'a' and 'b'; and calculating correction factors used to correct position shift between the two images 'a' and 'b' based on the narrowed pairs of feature regions.

Also, the above exemplary embodiment is applied to the image information processing system for extracting added information from a paper document by obtaining a difference between the scan image and the original image. However, the invention is not limited thereto. The invention may be applied to a general image information processing system involving a process of detecting position shift between two images and performing position alignment (position correction) between the two images such as an image information processing system for examining as to whether or not a security document has been falsified or a image information processing system for searching two images for a similar image or the same image, or for verifying two images.

What is claimed is:

1. An image processing apparatus comprising:
a feature region extracting section that extracts a plurality of feature regions from each of first and second images;
a feature amount calculating section that calculates feature amounts of the feature regions extracted by the feature region extracting section;
a position calculating section that calculates positions of the feature regions extracted by the feature region extracting section;
a first selecting section that selects pairs of feature regions, which are estimated to be common in the first and second images, based on the feature amounts calculated by the feature amount calculating section and the positions of the feature regions calculated by the position calculating section;
a second selecting section that narrows down the selected pairs of feature regions based on similarity in relative positional relation between the feature regions of the first and second images;
a correction factor calculating section that calculates a correction factor used to correct position shift between the first and second images based on the narrowed pairs of feature regions by the second selecting section; and
the image processing apparatus being a hardware processor.

2. The apparatus according to claim 1, further comprising:
a feature-region-information storage section that stores the feature amounts calculated by the feature amount calculating section and the positions of the feature regions calculated by the position calculating section as feature region tables of the first and second images with associating the calculated feature amounts and the calculated positions of the feature regions with the feature regions extracted by the feature region extracting section;
a similarity selection criterion setting section that sets a similarity selection criterion of the feature amount in the first selecting section and sets a similarity selection criterion of the relative positional relation in the second selecting section;
a table conversion section that converts the feature region table of the second image in accordance with the correction factor calculated by the correction factor calculating section; and
a control unit that executes a process of the first selecting section, a process of the second selecting section, a process of the correction factor calculating section and a process of the table conversion section repeatedly with changing the similarity selection criteria set by the similarity selection criterion setting section.

3. The apparatus according to claim 2, wherein:
the second selecting section comprises:
a parameter calculating section that calculates a parameter for position alignment from a feature region pair list including the pairs of feature regions selected by the first selecting section;
a pair list converting section that converts data indicating a position of the feature region, which are derived from the second image and included in each pair in the feature region pair list, based on the parameter for position alignment calculated by parameter calculating section;
a position shift calculating section that calculates a value corresponding to position shift between the feature regions of each pair in the feature region pair list converted by the pair list converting section; and
a feature-region-pair eliminating section that eliminates, from the feature region pair list, a pair of feature regions having the value corresponding to the position shift calculated by the position shift calculating section is larger than a value of the similarity selection criterion of the relative positional relation set by the similarity selection criterion setting section.

4. The apparatus according to claim 3, wherein a process of the parameter calculating section, a process of the pair list converting section, a process of the position shift calculating section and a process of the feature-region-pair eliminating section are executed repeatedly.

5. The apparatus according to claim 2, wherein:
the control unit comprises:

a first process loop for executing the process of the first selecting section and the process of the second selecting section for the feature region table of the second image while changing at least the similarity selection criterion of the feature amount set by the similarity selection criterion setting section from a strict setting to a relaxed setting until number of the pairs of feature regions narrowed by the second selecting section is equal to or larger than a predetermined value, and a second process loop for executing the process of the first selecting section and the process of the second selecting section for the feature region table of the second image with changing at least a search range of the pairs of feature regions in the similarity selection criterion of the feature amount set by the similarity selection criterion setting section from a range ultimately set by the first process loop to a narrower range.

6. A non-transitory computer readable medium storing a program causing a computer to execute image processing, the image processing comprising:

- extracting a plurality of feature regions from each of first and second images;
- calculating feature amounts of the extracted feature regions;
- calculating positions of the extracted feature regions;
- selecting pairs of feature regions, which are estimated to be common in the first and second images, based on the calculated feature amounts and the calculated positions of the feature regions;
- narrowing down the selected pairs of feature regions based on similarity in relative positional relation between the feature regions of the first and second images; and
- calculating a correction factor used to correct position shift between the first and second images based on the narrowed pairs of feature regions.

7. An image processing method comprising:

- extracting a plurality of feature regions from each of first and second images;
- calculating feature amounts of the extracted feature regions;
- calculating positions of the extracted feature regions;
- selecting pairs of feature regions, which are estimated to be common in the first and second images, based on the calculated feature amounts and the calculated positions of the feature regions;
- narrowing down the selected pairs of feature regions based on similarity in relative positional relation between the feature regions of the first and second images;
- calculating a correction factor used to correct position shift between the first and second images based on the narrowed pairs of feature regions, wherein
- one of the steps is performed with a processor.

* * * * *